Patented July 25, 1944

2,354,550

UNITED STATES PATENT OFFICE 2,354,550

LUBRICANT

Raphael Rosen, Elizabeth, N. J., assignor to Standard Oil Development Company, a corporation of Delaware No Drawing. Application October 7, 1940,
Serial No. 360,127

16 Claims. (Cl. 252—35)

This invention relates to the use of a new type of sulfur-containing organic compounds, hereinafter referred to as thioether derivatives of organic acids and derivatives thereof, as oil improving agents.

This application is a continuation-in-part of application Serial No. 21,402, filed May 14, 1935, and issued as Patent No. 2,216,751.

According to the present invention, compounds having the general formula $RY(Z)_nCY'Y'X$, where Y may be either sulfur, selenium, or tellurium, Y' may be either oxygen, sulfur, selenium, or tellurium, R represents an alkyl, aralkyl, cycloalkyl, aryl, or alkaryl group, which may be substituted by various substituents, e. g., OH, $NH_2$, halogen, $NO_2$ groups, Z represents a bivalent hydrocarbon radical, a bivalent sulfur-containing hydrocarbon radical, e. g., $-CH_2Y-$, $=CHSR$, or a substituted derivative thereof, $n$ is a whole number, and X represents hydrogen, a metal or other inorganic or organic cation, or hydrocarbon or substituted hydrocarbon radical, are incorporated in hydrocarbon oils with advantageous results.

Some compounds of the above type have been incorporated, in the form of vegetable oil blends thereof, into such products as paints, varnishes, and lacquers; however, the compounds which have been used for such purposes are generally insoluble in mineral oils. In order to impart solubility in mineral oils to these compounds, it has been found advantageous to include relatively long aliphatic chains in the molecules thereof; thus compounds suitable for use according to the process of this invention should contain at least 7 to 16 carbon atoms per molecule. In addition to their solubility in mineral oils, the compounds of this invention possess an added advantage from a physical standpoint; namely, they are sufficiently high in molecular weight so that they are non-volatile at automotive engine temperatures thus, enabling them to stay with the mineral oil and continually protect it from degradation.

It is not desired to limit the invention to any particular method of preparing these compounds. One method of preparing the acids is illustrated by the following reaction:

$C_5H_{11}SNa + ClC_{16}H_{32}COOH \rightarrow$
$C_5H_{11}SC_{16}H_{32}COOH + NaCl$ In other words, a sodium mercaptide is reacted with a halogen-substituted organic acid to form a thioether derivative of the organic acid. The mercaptides used may contain from 1 to 20 or more carbon atoms per molecule, and the halogenated organic acids used may contain from 2 to 20 or more carbon atoms per molecule. As indicated above, the mercaptides and the halogenated organic acids may contain aralkyl, cycloalkyl, aryl, alkaryl groups, or substituted derivatives thereof instead of, or in addition to, alkyl groups. The number of carbon atoms on each side of the sulfur group atom may be varied within a wide range, and may be as low as 1 carbon atom on either side. However, for the sake of oil solubility, the total number of carbon atoms in the hydrocarbon groups on both sides of the sulfur group atom must be at least 6 in case both hydrocarbon groups are aliphatic and at least about 15 in case one of the groups is aromatic. The aliphatic groups may be primary, secondary, or tertiary alkyl radicals. The cyclic groups may be aromatic or hydroaromatic radicals, or alkylated derivatives thereof. The mineral oil solubility of the compounds of this invention, in general, decreases in the following order: compounds containing only aliphatic groups, and having a total of more than 7 carbon atoms per molecule; compounds containing alkylated hydroaromatic groups; compounds containing alkylated aromatic groups; compounds containing aromatic groups. In general, the compounds containing branched-chain groups have lower viscosities than do the corresponding straight-chain compounds.

Any of the halogens may be used in preparing the halogenated acids, although chlorine is preferred since it is the cheapest. When it is desired that the final product should contain a halogen substituent, the halogenated organic acid should contain two or more halogen atoms per molecule. Instead of the sodium mercaptides, other alkali metal mercaptides may be used in preparing the compounds of this invention, if desired.

Merely by way of illustration and not with the intention of limiting the invention, the following specific examples of thioether derivatives of organic acids are enumerated:

| Name | Formula |
|---|---|
| Phenyl thioether of capric acid | $C_6H_5SC_9H_{18}COOH$ |
| Butylphenyl thioether of caproic acid. | $C_4H_9C_6H_4SC_5H_{10}COOH$ |
| Chlorohexyl thioether of caproic acid. | $ClC_6H_{12}SC_5H_{10}COOH$ |
| Butylphenyl thioether of fatty acids derived from the oxidation of paraffin wax. | $C_4H_9C_6H_4S(CH_2)_xCOOH$ |
| Propyl thioether of fatty acids derived from the oxidation of paraffin wax. | $C_3H_7S(CH_2)_xCOOH$ |
| Cyclohexyl thioether of chloroacetic acid. | $C_6H_{11}SCHClCOOH$ |
| Tetramethylbutyl hydroxy phenyl thioether of acetic acid. | (see structure below) |

$$C_8H_{17}\!\!-\!\!\underset{OH}{\underset{|}{\bigcirc}}\!\!-\!\!SCH_2COOH$$

| Name | Formula |
|---|---|
| Bornyl thioether of valeric acid | $C_{10}H_{17}SC_4H_8COOH$ |
| Benzyl thioether of propionic acid. | $C_6H_5CH_2SC_2H_4COOH$ |
| Amyl thioether of ethanethiolic acid. | $C_5H_{11}SCH_2COSH$ |
| Lauryl thioether of ethanethionic acid. | $C_{12}H_{25}SCH_2CSOH$ |
| Methyl thioether of octadecanethionthiolic acid. | $CH_3SC_{17}H_{34}CSSH$ |
| Amyl thioether of acetic acid | $C_5H_{11}SCH_2COOH$ |
| Lauryl thioether of acetic acid | $C_{12}H_{25}SCH_2COOH$ |
| Methyl thioether of stearic acid | $CH_3SC_{17}H_{34}COOH$ |
| Methyl thioether of oleic acid | $CH_3SC_{17}H_{32}COOH$ |
| Secondary hexyl thioether of acetic acid | $C_6H_{13}SCH_2COOH$ |
| i-Butyl thioether of propionic acid. | $C_4H_9SC_2H_4COOH$ |
| i-Propyl thioether of butyric acid. | $C_3H_7SCHCH_2COOH$ with $CH_3$ branch |
| i-Propyl thioether of isobutyric acid. | $C_3H_7SCH_2CHCOOH$ with $CH_3$ branch |
| Ethyl thioether of tri-tetramethylene tri-thioether of acetic acid. | $C_2H_5S(C_4H_8S)_3CH_2COOH$ |
| Di-(amyl thioether) of isovaleric acid. | $(C_5H_{11}S)_2CHCH\!-\!CH_2COOH$ with $CH_3$ branch |

The invention includes the use of such compounds as are indicated above as well as derivatives thereof, e. g., the halogen, $NH_2$, OH and $NO_2$ derivatives in lubricating oils to improve their load-carrying capacity and to act as oxidation inhibitors.

If alkali metal salts of oil-soluble thioether derivatives of organic acids are reacted with compounds of metals of the 2nd, 3rd, 4th, 5th, 7th and 8th groups of the periodic table, metallic salts of the substituted organic acids are formed; these salts are suitable for use as oxidation inhibitors and sludge dispersers in mineral oils such as motor lubricating oils, etc. Compounds of various metals, such as the following, may be used in the reaction with the alkali metal salts of the substituted organic acids: Ca, Ni, Co, Pb, Sn, Bi, Hg, Ba, Mg, Mn, etc. Specific compounds representative of those which may be used as lubricating oil addition agents include the following:

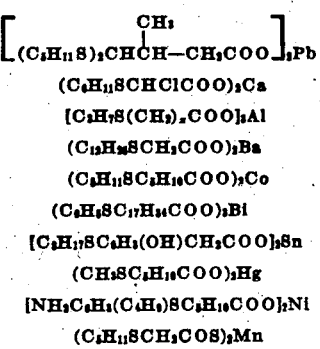

$[(C_5H_{11}S)_2CHCH\!-\!CH_2COO]_2Pb$ with $CH_3$ branch $(C_6H_{11}SCHClCOO)_2Ca$ $[C_3H_7S(CH_2)_xCOO]_3Al$ $(C_{12}H_{25}SCH_2COO)_2Ba$ $(C_5H_{11}SC_2H_4COO)_2Co$ $(C_6H_5SC_{17}H_{34}COO)_3Bi$ $[C_8H_{17}SC_6H_3(OH)CH_2COO]_2Sn$ $(CH_3SC_9H_{18}COO)_2Hg$ $[NH_2C_6H_3(C_4H_9)SC_5H_{10}COO]_2Ni$ $(C_5H_{11}SCH_2COS)_2Mn$

EXAMPLE 1

The cobalt salt of alpha-amyl mercapto caproic acid was prepared by the reaction of sodium alpha-amyl mercapto caproate with cobalt chloride in ethyl alcohol solution. The alcohol solution of the cobalt alpha-amyl mercapto caproate is separated from the precipitated sodium chloride by filtration, and then evaporated to dryness. The resulting material was shown to be non-corrosive to bearing metals, and to be effective as an oxidation inhibitor for lubricating oils.

A further important property of lubricating oil addition agents is their ability to disperse sludge formed in the oil during the operation of the engine in which the oil is being used. If this sludge is not kept in dispersed form, it settles out on the cylinder walls and piston surfaces, and, if this is allowed to go on for a time, the pistons become stuck and incapable of further movement until the sludge deposits (converted to hard carbon and "varnish" by the heat of the engine) are removed.

A laboratory test has been developed for determining the sludge dispersing properties of oils. According to the test procedure, 450 g. of oil are heated to 225° F. and agitated during the gradual addition of 30 g. of carbon black. After 30 minutes of further stirring, the suspension is transferred to a graduated 500 cc. cylinder, allowed to settle for 22 hours in an oil bath maintained at 200° F., and then allowed to stand for an additional two hours at room temperature. When the oil contains no dispersing agent, the carbon black settles out and leaves a clear, supernatant layer of oil. In the presence of an effective dispersing agent, however, the carbon black remains suspended throughout the entire volume of oil in the cylinder. The amount of carbon black suspended in the zone approximately 25 cc. below the surface of the oil is determined by a turbidimetric comparison method, and reported in mgs. of carbon per cc. of oil. The cobalt salt of alpha-amyl mercapto caproic acid was tested by this method, and the sludge dispersion results are given below:

| Oil | Sludge dispersion results | |
|---|---|---|
| | Mgs. of carbon/cc. of oil | Cc. of clear oil |
| Oil A[1] | 0 | 200 |
| Oil A + 5% additive | 7 | 0 |

[1] A naphthenic base lube oil having a Saybolt viscosity of 55 sec. at 210° F.

Thus, it may readily be seen that this addition agent, cobalt alpha-amyl mercapto caproate, is effective as a sludge dispersing agent.

EXAMPLE 2

The calcium salt of alpha-lauryl mercapto caproic acid was prepared in the manner described for the preparation of cobalt apha-amyl mercapto caproate in Example 1. This compound has also been shown to be an effective oxidation inhibitor for lubricating oils. In addition, its corrosiveness to bearing metals was determined.

The test method used for determining the corrosion resistance of blends containing this addition agent was the S. O. D. bearing corrosion test. Briefly, this test consists in rapidly rotating specimens of bearing metals in a sample of the test oil maintained at 325° F. and through which air is bubbled at a constant rate. The loss in weight of the bearing specimens is determined at various time intervals. The test results obtained on calcium alpha-lauryl mercapto caproate are presented below, together with those for mixed aluminum and calcium sweater oil soaps, and calcium petroleum phenolates, which are included for purposes of comparison:

| Oil | Bearing metals | S. O. D. corrosion results; loss in bearing weight, gms. | | |
|---|---|---|---|---|
| | | 1 hr. | 3 hrs. | 5 hrs. |
| Oil A[1]+0.25% of Al-Ca sweater oil soaps | Cd-Ag | 0.026 | 0.137 | 0.294 |
| | Cu-Pb | 0.032 | 0.077 | 0.147 |
| Oil A+0.5% of Ca petroleum phenolates | Cd-Ag | | | 0.320 |
| | Cu-Pb | | | 0.082 |
| Oil A+0.25% of Ca α-lauryl mercapto caproate | Cd-Ag | 0.006 | 0.033 | 0.089 |
| | Cu-Pb | 0.009 | 0.042 | 0.084 |
| Oil A+0.5% of Ca α-lauryl mercapto caproate | Cd-Ag | 0.002 | 0.052 | 0.115 |
| | Cu-Pb | 0.006 | 0.037 | 0.083 |

[1] A naphthenic base lube oil having a Saybolt viscosity of 55 sec. at 210° F.

It will be seen from these data that the addition agent of this invention protects bearings from corrosion better (with one exception) than do the other products listed above. In the cases of the calcium petroleum phenolates and the calcium α-lauryl mercapto caproate, the copper-lead bearings were corroded to the same extent after five hours, but the cadmium-silver bearings were protected from corrosion much better by the product of this invention.

Thus, the metal soaps of thioether derivatives of organic acids are eminently suitable for use as lubricating oil addition agents, in that they are effective sludge dispersers and oxidation inhibitors, and are non-corrosive to certain bearing metals and other engine parts.

Metallic salts of substituted organic acids containing selenium or tellurium atoms instead of sulfur atoms may also be used as lubricating oil addition agents.

$$(C_{10}H_{17}SeC_4H_8COO)_2Mg$$

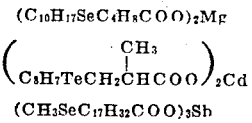

$$(CH_3SeC_{17}H_{32}COO)_3Sb$$

The metal soaps of thioether derivatives of organic acids also may advantageously be incorporated in grease and extreme pressure lubricant compositions; the following formulae are two examples of suitable compositions:

*Extreme pressure lubricant*

| | Per cent |
|---|---|
| Lead α-amyl mercapto stearate | 10 |
| Sulfur | 1 |
| Cylinder oil (vis. at 210° F.=110–160 secs.) | 89 |

*Roller bearing grease*

| | Per cent |
|---|---|
| Sodium oleate | 10–15 |
| Lead soaps of thioether derivatives of organic acids | 6–10 |
| Heavy lubricating oil | 75–80 |

Cobalt, manganese, and lead soaps of thioether derivatives of organic acids have good drying properties and may be used to accelerate the film-forming and hardening of vegetable or other fatty oils, such as linseed oil. For example, it has been found that lead alpha-amyl mercapto stearate, $[C_{16}H_{33}(C_5H_{11}S)CHCOO]_2Pb$, increases the oxygen absorption rate of linseed oil (measured by the pressure decrease, in millimeters of mercury) from 30 to 37 in 2 hours, and from 122 to 154 in 3.75 hours. The corresponding cobalt and manganese soaps are even better for this purpose than is the lead soap.

In addition to the thioether derivatives of organic acids and their metal soaps, inorganic (other than metal) and organic soaps and esters of these acids have also been found to be useful as lubricating oil addition agents. The inorganic and organic soaps may be prepared by neutralizing the acids with the appropriate bases, such as amines, phosphines, and ammonium hydroxide. Esters of the thioether derivatives of organic acids may readily be prepared by reacting the acid with an organic compound containing a free hydroxyl or mercapto group in the presence of a small quantity of a catalyst, such as a mineral acid. The resulting esters may also contain free hydroxyl or mercapto groups, so that metallic derivatives thereof can be prepared and used as lubricating oil addition agents. Several examples of such thioether derivatives of organic acids which are suitable for use as lubricant additives are given below:

Ammonium octadecyl mercapto caproate

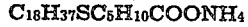

Amyl tetramethylbutyl cyclohexyl mercapto acetate

Cobalt salt of the lauryl ester of the tetramethylbutyl hydroxy phenyl thioether of propane thionic acid

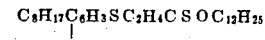
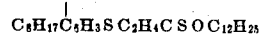

Also, if desired, thioether derivatives of naphthenic acids can be used, particularly of the naphthenic acids obtainable from petroleum fractions.

It is not intended that this invention be limited to any of the specific examples given nor to any theories suggested as to the operation of the invention, but, in the appended claims, it is intended to claim all novelty inherent in the invention as broadly as the prior art permits.

I claim:

1. A lubricant comprising a major portion of a mineral lubricating oil and a small amount of a compound having the general formula

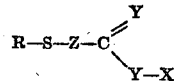

where R is an aliphatic hydrocarbon radical and Z represents a hydrocarbon radical selected from the class consisting of aliphatic and naphthenic radicals, both R and Z being linked to the sulfur atom by carbon bonds and having a total of more than 6 carbon atoms, Y is an element of the group comprising oxygen and sulfur, and X is a substituent which by hydrolysis of the compound is replaced by hydrogen.

2. A lubricant comprising a major portion of a mineral lubricating oil and a small amount of a compound having the general formula

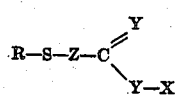

where R and Z represent aliphatic hydrocarbon radicals linked to the sulfur atom by carbon bonds and having a total of more than 6 carbon atoms, Y is an element of the group comprising oxygen and sulfur, and X is a substituent which by hydrolysis of the compound is replaced by hydrogen.

3. A lubricant comprising a major portion of a mineral lubricating oil and a small amount of a compound having the general formula

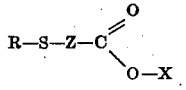

where R and Z represent aliphatic hydrocarbon radicals linked to the sulfur atom by carbon bonds and having a total of more than 6 carbon atoms, and X is a substituent which by hydrolysis of the compound is replaced by hydrogen.

4. A lubricant comprising a major portion of a mineral lubricating oil and a small amount of a salt having the general formula

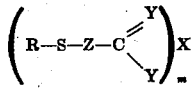

where R and Z are aliphatic hydrocarbon radicals linked to the sulfur atom by carbon bonds and having a total of more than 6 carbon atoms, Y is an element of the group comprising oxygen and sulfur, X is an inorganic cation, $m$ is an integer corresponding to the valence of X.

5. A lubricant comprising a major portion of a mineral lubricating oil and a small amount of a salt having the general formula

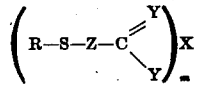

where R and Z are aliphatic hydrocarbon radicals linked to the sulfur atom by carbon bonds and having a total of more than 6 carbon atoms, Y is an element of the group comprising oxygen and sulfur, X is an organic cation, $m$ is an integer corresponding to the valence of X.

6. A lubricant comprising a major proportion of a mineral lubricating oil and a small amount of an oil-soluble organic compound having the general formula RYZCOOM, in which Y is selected from the group consisting of sulfur, selenium and tellurium, R and Z represent hydrocarbon radicals containing a total of more than six saturated aliphatic carbon atoms, each of said radicals having a carbon atom attached to Y, and M is a metal.

7. A lubricant comprising a major proportion of a mineral lubricating oil and a small amount of an oil-soluble organic compound having the general formula $(RSZCOO)_mM$, in which R and Z are both hydrocarbon radicals containing aliphatic groups, said hydrocarbon radicals containing a total of more than six saturated aliphatic carbon atoms, M is a metal selected from groups II to V of the periodic table, and $m$ is an integer corresponding to the valence of M.

8. A lubricant according to claim 1 in which the group

is a naphthenic acid group.

9. A lubricant according to claim 2 in which Z represents the hydrcarbon radicals present in fatty acids obtained by the oxidation of paraffin waxes.

10. A lubricant according to claim 2 in which R is an alkyl group having more than ten carbon atoms.

11. A lubricant according to claim 2 in which at least one of the groups R and Z contains at least one substituent halogen atom.

12. A lubricant according to claim 4 in which X is a polyvalent metal selected from groups II, III, IV, V, VII, and VIII of the periodic table.

13. A lubricant according to claim 4 in which X is a bivalent metal.

14. A lubricant comprising a major proportion of mineral lubricating oil and a small amount of lead alpha-(amyl mercapto) stearate.

15. A lubricant comprising a major porportion of a mineral lubricating oil and a small amount of cobalt amyl mercapto caproate.

16. A lubricant comprising a major proportion of a mineral lubricating oil and a small amount of calcium lauryl mercapto caproate.

RAPHAEL ROSEN.